United States Patent Office 3,328,244
Patented June 27, 1967

3,328,244
METHOD OF CONTROLLING UNDESIRABLE FISH
Charles Allan Shadbolt, Prairie Village, Kans., assignor to Thompson-Hayward Chemical Company, Kansas City, Kans., a corporation of Delaware
No Drawing. Filed Feb. 8, 1966, Ser. No. 525,830
4 Claims. (Cl. 167—46)

This invention relates to and has for its objects novel methods of wildlife conservation and new compositions useful for such purposes. More particularly, this invention relates to novel methods of controlling certain undesirable species of fish and to novel compositions useful therefor.

As civilization progresses, man has found it necessary to adapt nature to his needs. In so doing, man's other needs have sometimes caused an imbalance in nature which has resulted in the loss of some of man's natural resources, for example, fresh water areas and certain forms of wildlife. In light of these events, government bodies and natural resource conservationist groups and agencies have urged and encouraged the voluntary conservation of these threatened resources to guarantee their future availability for the general public. In fact, government itself has initiated very ambitious and extensive programs in the area of wildlife conservation. One manifestation of this program has been the fostering of water conservation by the promulgation of a general plan to encourage the construction and maintenance of good water areas to benefit the entire community. One element of this plan calls for the construction and maintenance by individual members or groups of the general public, of new ponds for fishing.

Such ponds are beneficial in that they create bodies of water where none existed before. These ponds are beneficial to farmers and hunters and fishermen who benefit directly from the water and the wildlife it supports. In a broader sense, the entire country benefits from such a program; for each new pond properly constructed and maintained is a unit in the national water conservation program. This is true of ponds which are built solely for farm use and even more true of ponds maintained to produce wildlife as well.

The mere construction of these ponds however, is not sufficient to assure the provision of beneficial results therefrom. A satisfactory program of continued management and maintenance must be undertaken in order to produce a satisfactory yield of desirable fish and to attract and support many kinds of wildlife and proper methods must be followed for successful results. Thus, a desirable object of this phase of the water conservation program is a method of obtaining the highest production of desirable fish from the ponds involved and at the same time providing a permanent supply of good water for livestock, and also attracting other desirable or necessary forms of wildlife.

One of the major reasons which has heretofore been found to be the cause of failure of this fishing pond program has been the faulty management for fish production, including poor stocking, harvesting and weed control, on behalf of the operators. The proper stocking and maintenance of these ponds with desirable fish not only increases opportunities for good fishing, but is helpful in restoring upland wildlife. Two species of fish recommended for stocking ponds are bluegill sunfish and largemouth black bass. The bluegill spawn when one year old and throughout the summers thereafter and furnish forage for the bass. The bluegill is a prolific fish and if not controlled in some manner will overcrowd the pond and result in stunted fish and poor yields. In addition, the presence of certain catfish is desirable in the maintenance of the ponds. One especially desirable species, the channel catfish, however, has not been heretofore successfully managed in these pond programs since they are preyed upon by bluegill and bass, and when the bluegill become too numerous, the catfish are crowded out. It is also to be noted that ponds must be stocked with both bass and bluegill in order to obtain a fish production, and ponds having bluegill alone will become crowded with undersized fish in short order and fail. Likewise without the bluegill to feed on, the bass will not have the amount or the quality of food necessary for sustained production. Heretofore, an efficient and comparatively easy method of balancing the fish population of the pond while at the same time protecting and encouraging desirable species proliferation has not been possible. Once the bluegill or other undesirable fish overcrowd the pond it begins to fail. Since it is a rule that at least three to four pounds of bluegill must be removed for every pound of bass harvested, a good method of control is essential to the maintenance of the pond. Since the average bluegill will not weigh over one-fourth pound and the average bass perhaps one pound, a good rule is to remove twelve to fifteen bluegill for each bass caught. Unless this is done the bass cannot control the bluegill and the crowded, stunted and hungry bluegill will feed upon bass eggs and fry. When a nesting bass is confronted with a multitude of starving bluegill, the bass is unable to keep all of them away from the nest and the bluegill devour the eggs. Thus, the bass fail to reproduce, and soon pass out of the picture both as the natural control of the bluegill and as a fish to catch. The result is a pond filled to capacity with bluegill, few large enough for sport or table use. Under such conditions restocking with bass will not help because unless the surplus bluegill are removed, the restocked bass upon reaching spawning maturity will suffer the same fate as their predecessors in not being able to reproduce.

Heretofore, there has not been an efficient method for bringing the pond population into balance. Methods employed in an attempt to control or regulate undesirable fish species have not been either efficient or successful. One method employed has been to eradicate the entire fish population of the pond, drain it and then renovate and restock it. This has not been economically successful. Thus, it would be extremely desirable and beneficial if a method of managing and controlling certain undesirable species of fish were developed.

It has now been discovered that certain undesirable species of fish can be controlled by the novel methods of this invention and the compositions employed in the practice thereof. More particularly, it has been found that certain undesirable species of fish may be controlled by contacting the said fish with a small but effective amount of a suitable composition comprising as its principal active ingredient a compound of the general formula:

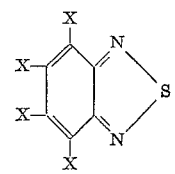

wherein each X may be the same or different and may be selected from the group consisting of hydrogen; halogen, for example, chlorine or bromine; lower alkyl, for example, methyl or ethyl; and lower alkoxy, for example, methoxy or ethoxy; said principal active ingredient dispersed in a substantial amount of a suitable extending agent.

In the preferable embodiment of this invention X is chlorine, methyl or methoxy and at least one X is hydrogen. Most perferably, the principal active ingredient of this invention may be selected from the group consisting of 4,5,7-trithalobenzthiadiazole, e.g. 4,5,7-trichlorobenzthiadiazole; and 4-alkyl-7-halobenzthiadiazole, e.g. 4-methyl-7-chlorobenzthiadiazole.

The undesirable species of fish which may be controlled by the practice of this invention include those of the families Centrarchidae, e.g. sunfish, bluegill; the Siluridae e.g. catfish; and Cyprinidae e.g. carp. Since the amount of control will vary with each species, it has been found most preferable to practice this invention in the control of the Centrarchidae, and most satisfactory results have been obtained.

In this disclosure and the claims appended thereto, the term, "dispersed" is used in its widest possible sense. When it is said that the compounds of this invention are dispersed it means that the particles may be molecular in size and held in true solution in a suitable solvent. It means further, that the particle may be colloidal in size and dispersed through a liquid phase in the form of suspensions or emulsions or in form of particles or droplets held in suspension by wetting agents. The term "dispersed" also means that the particles may be mixed with and spread throughout a solid carrier so that the mixture is in the form of powder or dust. The term "dispersed" also includes mixtures which are suitable for use in aerosol containing solutions, suspensions or emulsions of the agents of this invention in a solvent or carrier, and a suitable propellent, such as a Freon which boils below room temperature at ordinary pressure.

The term "extending agent" as used in this disclosure and in the appended claims, includes any and all of those agents in which the compounds of the instant invention are dispersed. It includes, therefore, the solvents of a true solution, the liquid phase of suspensions, emulsions or aerosols, the semi-solid carrier and the solid phase of dust and powders. The extending agent must be one which will permit employment of the principal active ingredient in water.

It has been found that the compounds of this invention are active when dispersed in an extending agent at concentrations of 1.0% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the area being treated than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin such as castor oil or olive oil have been found to be suitable. Low boiling, more volatile solvents, for example ketones, such as acetone; alcohols, such as methanol and ethanol; aromatic hydrocarbons, such as benzene, toluene; and the like are also useful. For certain applications it may be advantageous to resort to mixtures of solvents.

If the active agents are to be applied as aerosols, it is convenient to dissolve them in a suitable solvent and to disperse the resulting solution in a gas such as a Freon which boils below room temperature. For such applications it is better to employ true solutions of the active agent although it is possible to employ suspensions or emulsions of the active agent.

The agents of this invention are often dispersed either in the form of emulsions or suspensions, in an inert carrier with the aid of a capillary active substance. Such capillary substances may be anion-active, cation-active or non-ionizing. There may be mentioned by way of example, natural or synthetic soaps, Turkey-red oil, fatty alcohol sulfates, esters of fatty acids and the like. Other examples include high molecular weight quaternary ammonium compounds as well as condensation products of ethylene and propylene oxide with alkyl phenols or monohydric and polyhydric alcohols.

For use as a powder or dust the active ingredients of this invention may be mixed with any of a number of extending agents either organic or inorganic in nature which are suitable for the manufacture of pulverulent preparations. In addition to mixing the ingredients directly, the active compounds of this invention may first be dissolved in a suitable solvent and the dry extending agents may be treated with the resulting solution so that after the solvent evaporates off the active ingredient is effectively coated on the surface of the extending agent. The extending agents which may be employed include, for example, tricalcium phosphate, calcium carbonate, kaolin, attapulgite, diatomite, dolomite, gypsum, pyrophyllite, montmorillonite, bentonite, bole, kieselguhr, talc, calcined magnesia, boric acid and others. Materials of vegetable origin such as powdered cork, soyabean flour, powdered tobacco, ground corn cobs, powdered wood and powdered walnut shells are also useful. These mixtures may be used in the dry form or, by the addition of wetting agents, the dry powder can be rendered wettable by water so as to obtain stable aqueous dispersions suitable for use as sprays.

In general, in the practice of this invention, the amount of the novel compositions of this invention which may satisfactorily be employed is that which will provide, in the environment or habitat of the fish being treated, a sufficient concentration of the principal active ingredient of said composition to control the undesirable species of fish without exercising any substantial effect or control over the desirable species of fish. It has been found that the most satisfactory results are obtained when the principal active ingredient of this invention is present in the habitat of the fish being treated in a concentration of from at least 0.1 part per million to about 5.0 parts per million and optimally from about 0.5 part per million to about 2.0 parts per million. It has also been found that the temperature of the water being treated also exerts some effect upon the concentrations of active ingredient required to obtain satisfactory results. In general slightly less amounts are required when the water being treated is at a temperature of below about 55° F. However, the variations caused by differences in water temperature are nominal and can be adjusted for by the worker skilled in the art.

The following examples are illustrative of the invention and should not be limitative thereof:

*Example 1*

10.0 g. of 4,5,7-trichlorobenzthiadiazole is dissolved in 150 ml. of toluene. The resulting solution is then placed in a vessel containing 30 g. of kaolin clay, 1.0 g. of nonyl phenolethylene oxide adduct is introduced, and the ingredients are thoroughly mixed, the solvent is driven off, and the resultant dry coated kaolin clay is dispersed in 500 cc. of water. This final suspension may be sprayed directly on the surface of the water to be treated to give the desired results.

Similarly following the procedure set forth in Example 1, but substituting equivalent amounts of 4-methyl-7-chlorobenzthiadiazole for the 4,5,7-trichlorobenzthiadiazole like results are obtained.

Similarly other surfactants such as Tweens; sulfonated polyesters, e.g. Nekals; oleoyltaurates, e.g. Igepons and the like can be substituted for the nonyl phenol adduct.

*Example 2*

Bioassay tests are made according to the standard procedure modified from American Public Health Association, American Water Works Association and Water Pollution Control Federation (1960) and the methods set forth and employed by the United States Department of the Interior, Bureau of Sport Fisheries and Wildlife, Bureau Circular 185 (June 1964). These tests are conducted on selected species of fish in a standard deionized water having incorporated therein the following ingredients:

Ingredient: Amount per liter, mg.
- Calcium sulfate _____ 30
- Magnesium sulfate _____ 30
- Sodium bicarbonate _____ 48
- Potassium chloride _____ 3

To this standard water was added sufficient amounts of the composition of Example 1 to provide a concentration therein of 0.01, 0.1, 0.8, 1.0, and 2.0 parts per million of the active ingredient, 4,5,7-trichlorobenzthiadiazole. Different species of fish were then loaded into the respective test tanks and permitted to remain for a twenty-four hour period, after which a check was made on their respective survival rates the results of which are tabulated below in Table 1.

TABLE 1.—SURVIVALS [1]

| Species of Fish | Concentrations [2] | | | | |
|---|---|---|---|---|---|
|  | 0.01 | 0.1 | 0.8 | 1.0 | 2.0 |
| Rainbow Trout | S | S | S | S | S |
| Goldfish | S | S | S | S | S |
| Black Bullhead | S | S | S | S | M |
| Bluegill Sunfish | S | S | M | M | M |

[1] S=Survival of Species; M=Mortality of Species.
[2] Expressed in parts per million of 4,5,7-trichlorobenzthiadiazole in water below 60° F.

*Example 3*

In a ribbon mixer, 500 lbs. of technical 4,5,7-trichlorobenzthiadiazole, 460 lbs. of attapulgite, 20 lbs. of sodium lignin sulfonate, and 20 lbs. of sulfonated aliphatic polyester, are thoroughly blended. This premix is ground through a hammer mill until 98% of the powder will pass a 325 mesh screen.

*Example 4*

In a vessel are added 872 gallons of xylene, 1250 lbs. of 4,5,7-trichlorobenzthiadiazole, and 400 lbs. of a blended anionic/nonionic emulsifier, are blended by agitation until approximately 1000 gallons of a homogenous solution is obtained.

The resulting solution is a water emulsifiable concentrate containing 1 lb. of active ingredient per gallon of concentrate. This concentrate may be diluted in the proportion of 1 gallon with 50 gallons of water prior to application. This emulsion obtained upon dilution of the concentrate with water may be applied by spraying over the surface of the water to be treated at a rate which will give the desired concentration of the active ingredient in the treated water.

The invention may be variously otherwise embodied within the scope of the appended claims.

What is claimed is:

1. A method of selectively controlling undesirable fish species which comprises causing said fish to be contacted with a small but effective amount of a compound of the formula:

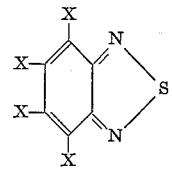

wherein each X is selected from the group consisting of hydrogen, halogen, lower alkyl and lower alkoxy.

2. The method of claim 1 wherein the said fish are contacted by application of the said compound to the waters inhabited by said fish.

3. The method of claim 1 wherein the said fish are contacted with said compound in a concentration of from about 0.1 part per million to about 5.0 parts per million of the waters inhabited by said fish.

4. The method of claim 1 wherein the compound is 4,5,7-trichlorobenzthiadiazole.

References Cited

UNITED STATES PATENTS 3,152,953    10/1964    Strong _____ 43—4.5

ALBERT T. MEYERS, *Primary Examiner.*

STANLEY J. FRIEDMAN, *Assistant Examiner.*